July 1, 1958 R. W. BERGSTROM ET AL 2,840,849
POULTRY BONING MACHINE
Filed Jan. 20, 1955 4 Sheets-Sheet 1
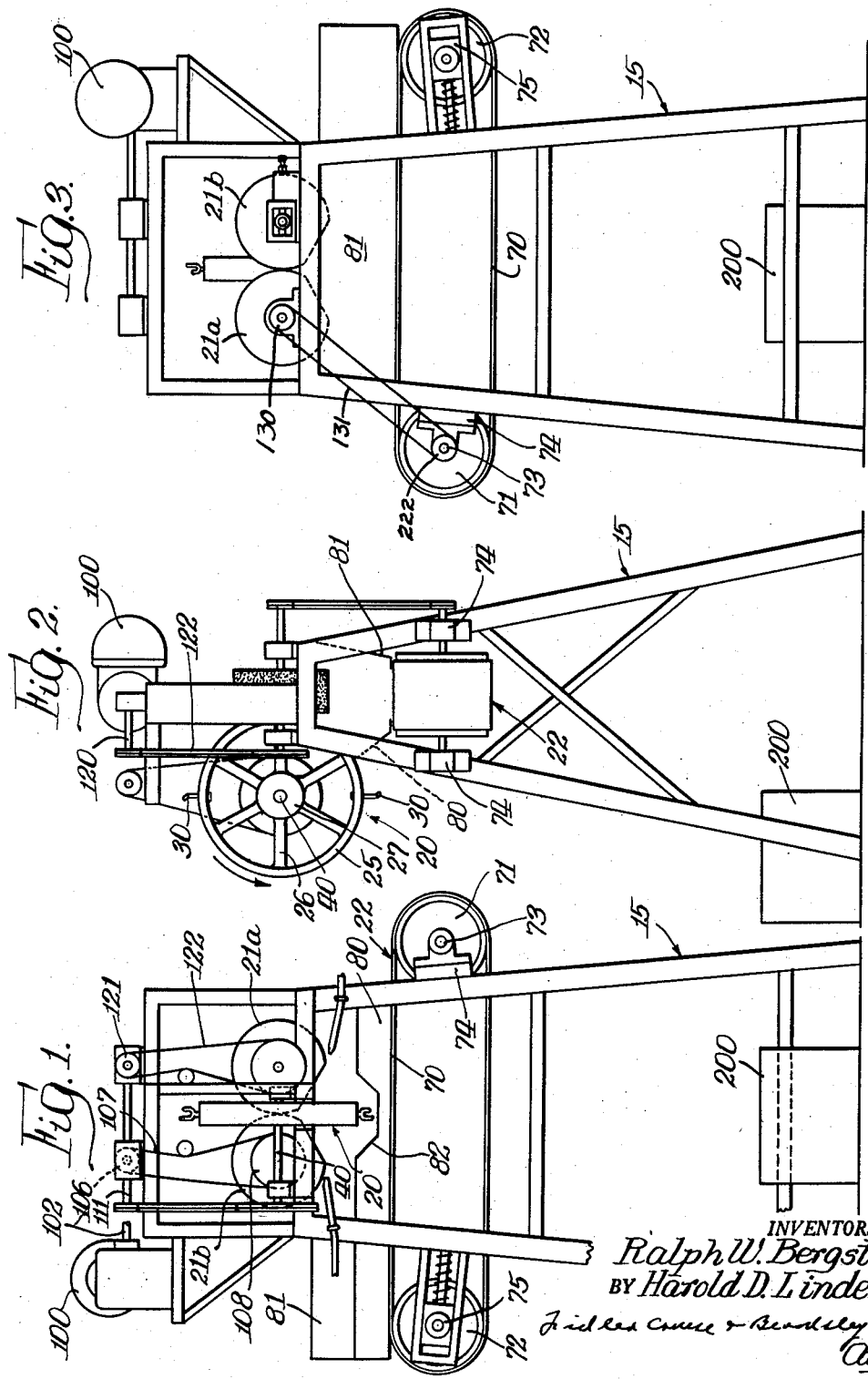
INVENTORS.
Ralph W. Bergstrom
BY Harold D. Lindeman

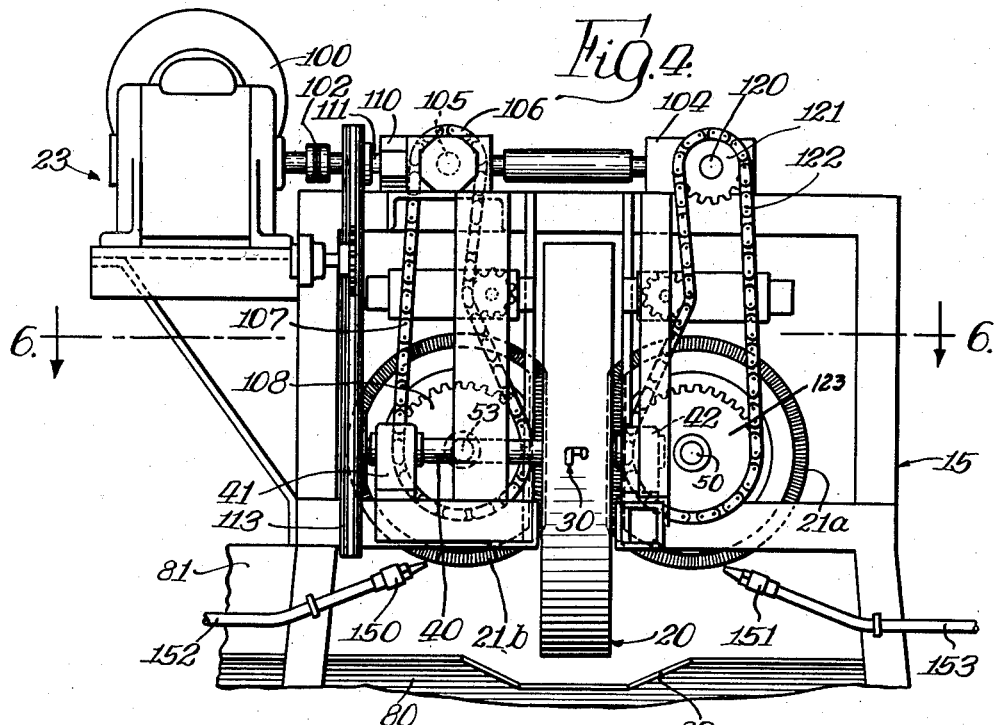
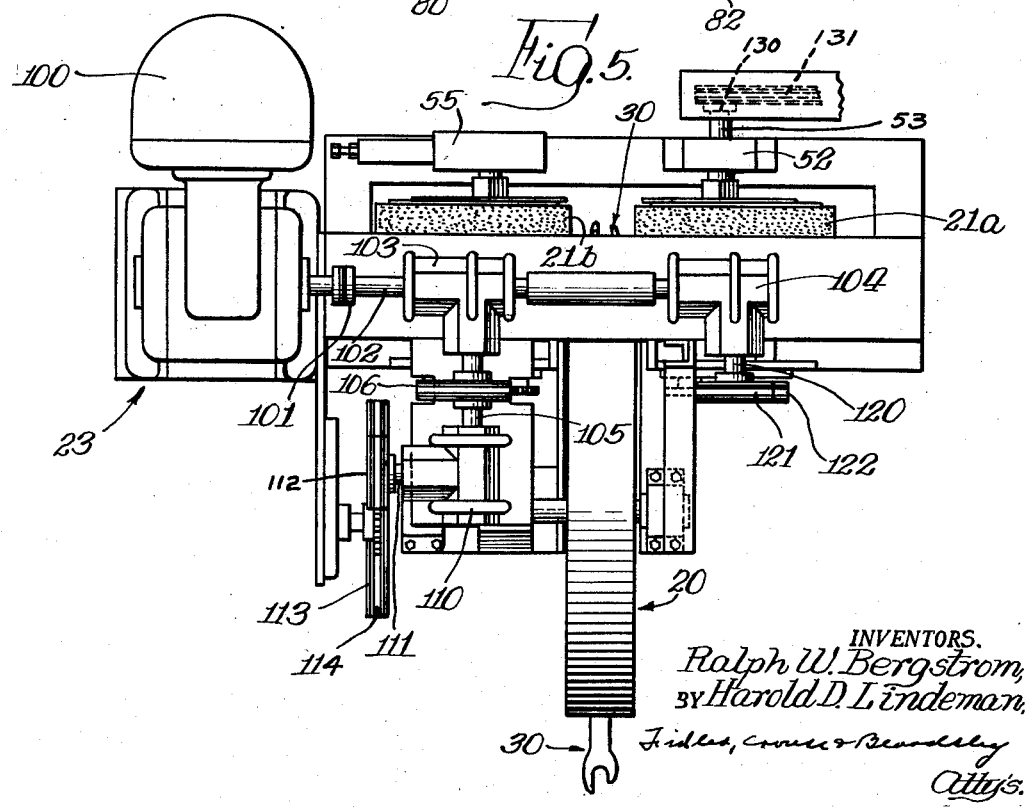

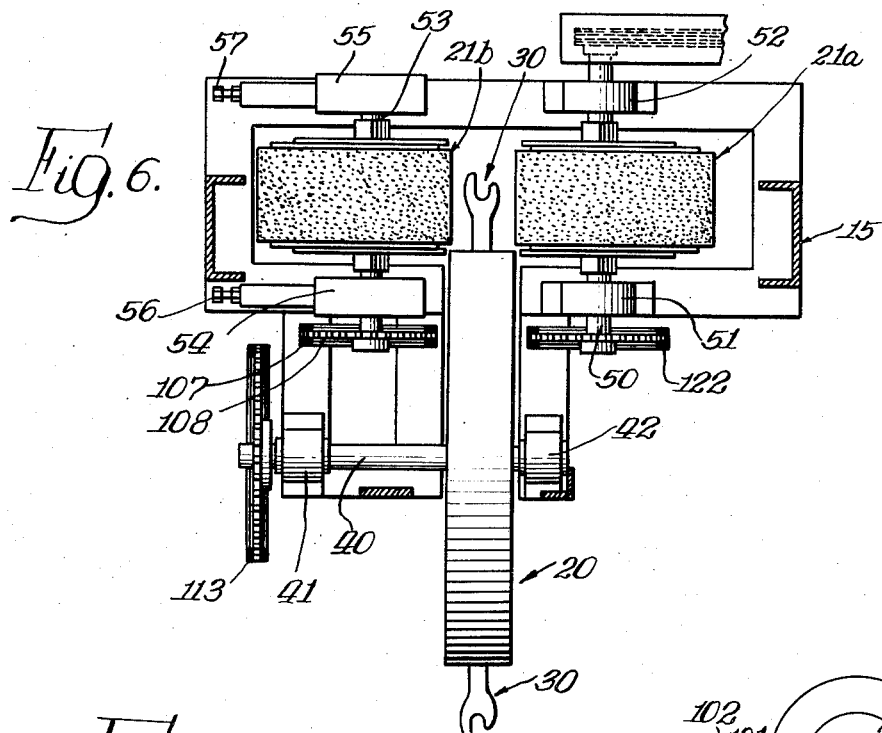
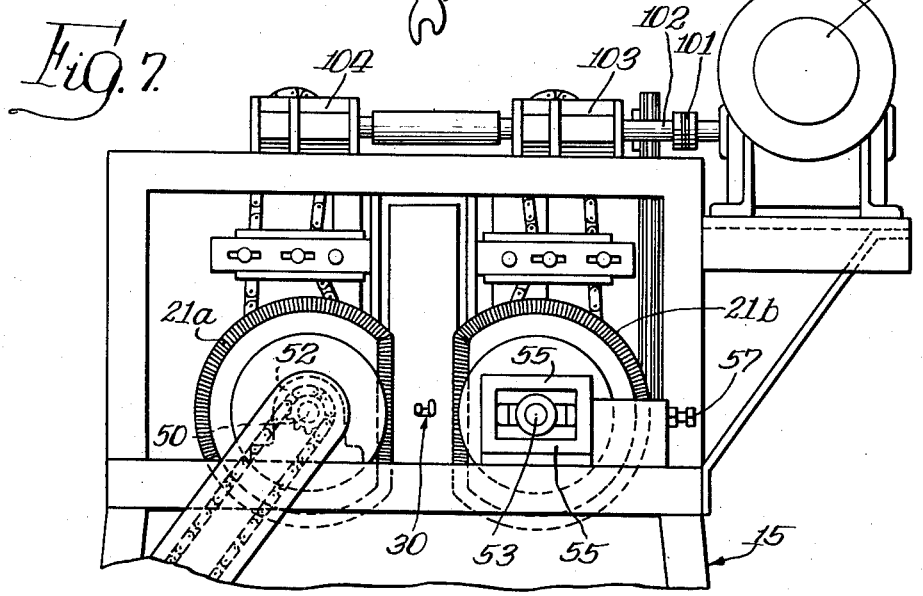

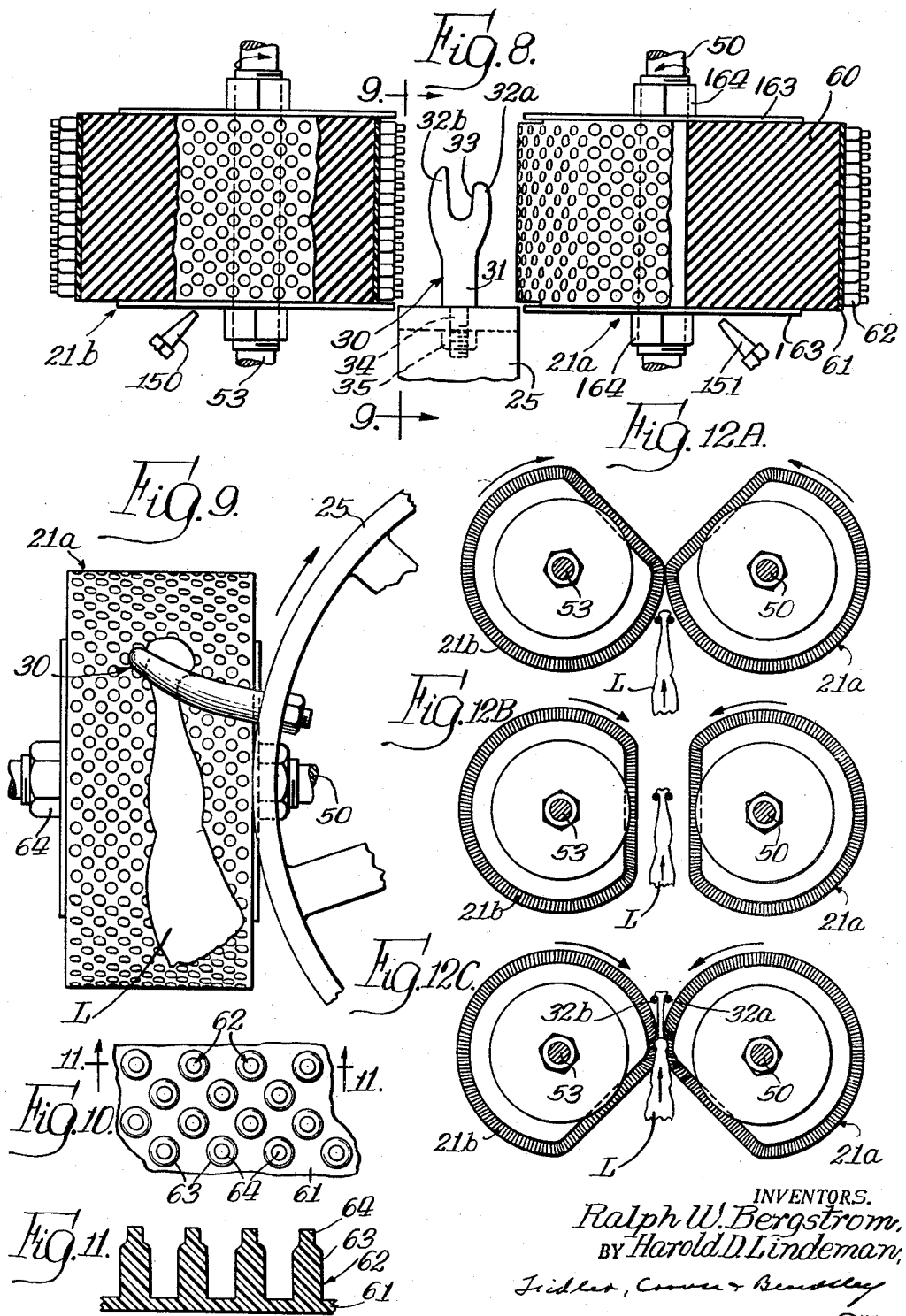

United States Patent Office 2,840,849
Patented July 1, 1958

2,840,849

POULTRY BONING MACHINE

Ralph W. Bergstrom and Harold D. Lindeman, Worthington, Minn., assignors, by mesne assignments, to Campbell Soup Company, Camden, N. J., a corporation of New Jersey Application January 20, 1955, Serial No. 482,956

9 Claims. (Cl. 17—1)

Our invention relates to a process and apparatus for boning poultry. It has to do more particularly with a process and apparatus for removing the meat from the leg bone and attached thigh bone of poultry.

Heretofore, in the de-boning of poultry the meat or flesh, after cooking, has been removed from the leg bone and attached thigh bone by a manual operation. In such operation, three cuts are made with a knife in removing the meat, the first cut being made lengthwise along the leg and thigh at the rearward side thereof, the second cut being made lengthwise along the leg at the forward side thereof, and the third cut being made lengthwise along the thigh at the forward side. This manual operation is time consuming and therefore relatively expensive. Moreover, the operator often breaks the needle-like bony members which lie close against the leg, with the result that the small fragment or fragments of such bony members may be removed with the meat. In the manual removal of the meat, the operator also often removes with the meat the gristle which covers the joint between the leg bone and the thigh bone or a portion of such gristle. Even with rigid inspection of the de-boned meat, there is a possibility of the aforementioned bony or gristle fragments being left in the meat when the same is canned or used in the production of items such as pies, salads, fricassees, etc. In addition, the removal of the meat from the leg and thigh bones in three separate pieces renders it less desirable for use in sliced form. Also, even where the operator is skilled, a certain quantity of meat often remains attached to the bone and is not recovered.

An object of the present invention is to provide a machine for mechanically removing the meat from a poultry leg bone, or leg bone and attached thigh bone.

Another object is to provide a machine for removing the meat from a poultry leg bone or leg bone and attached thigh bone without breaking or removing either the bony needle-like members which lie along the leg bone or the gristle which covers the joint between the leg and the thigh bones.

Another object is to provide a machine for removing the meat from the leg bone or the leg bone and attached thigh bone of the poultry in a single or a minimum number of pieces.

Still another object is to provide a machine for removing the meat from the leg bone or leg bone and attached thigh bone of poultry which machine is simple in operation and requires a minimum of repair and replacement of parts.

Still another object of the invention is the provision of a method for removing the meat from the leg bone or the leg bone and attached thigh bone of poultry wherein the meat is removed in such manner as not to break or dislodge either the needle-like bony members which lie along the leg bone or the gristle which covers the joint between the leg bone and thigh bone.

Other objects and advantages of the invention will appear from the following description taken in connection with the appended drawings wherein:

Fig. 1 is a somewhat diagrammatic front elevational view of a machine constructed in accordance with our invention;

Fig. 2 is an end elevational view of the machine of Fig. 1;

Fig. 3 is a rear elevational view of the machine of Fig. 1;

Fig. 4 is an enlarged fragmentary elevational view of the upper portion of the machine of Fig. 1 as viewed from the front and somewhat more in detail;

Fig. 5 is a plan view corresponding to Fig. 4;

Fig. 6 is a view taken along the line 6—6 of Fig. 4;

Fig. 7 is a view corresponding to Fig. 4 taken from the rear of the machine;

Fig. 8 is a further enlarged fragmentary and somewhat diagrammatic view of a portion of the machine of Fig. 1 and showing particularly the relationship between the leg-carrying hook and the meat removing rolls;

Fig. 9 is a view taken along the line 9—9 of Fig. 8 but with a poultry leg and thigh shown in position in the leg-carrying hook;

Fig. 10 is an enlarged fragmentary view of the surface of one of the rollers of Fig. 6;

Fig. 11 is a view of a section taken along the line 11—11 of Fig. 10; and

Figs. 12A, 12B and 12C are fragmentary diagrammatic views of the rolls and the cooperating leg hook which views show, respectively, successive positions of the rolls and leg hook during a cycle of operation of the machine.

The poultry is prepared for de-boning by first removing the feathers, the viscera, the head, and the feet up to the first joint where commences that part of the poultry that the usual consumer refers to as the "leg." Thereafter, the poultry is water-cooked (that is, simmered) for a sufficient period to render the meat tender and readily removable from the bone. On the other hand, the poultry should not be so over-cooked as to cause gelatinous substances which tend to cause the tendon and small bone to adhere to the knuckle joint to become loosened from the joint. In the case of fowl (that is, hens with one or more years of laying), the fowl is cooked in water at 210° F. for approximately two hours. After such cooking, the leg or the leg and attached thigh are removed from the fowl carcass and are in condition for removal of the meat from the bone or bones.

In accordance with the present invention, the leg and attached thigh (hereinafter called the "leg and thigh") are suitably suspended and the meat is removed from the leg bone and attached thigh bone by applying an opposing or squeezing pressure to the meat and simultaneously moving the meat in a direction longitudinally away from the hock of the leg to sweep or pull the meat from the bones of the leg and thigh. This squeezing and pulling action removes the meat from the leg and thigh bones in one or a small number of large pieces. At the same time, this squeezing and pulling action does not break or remove the needle-like bony members or the gristle which covers the knuckle or joint between the leg and thigh bones.

A machine for performing the aforesaid operation mechanically is illustrated in the drawings to which reference now is made.

The machine includes a supporting frame 15 (as shown especially in Figs. 1 to 3), which preferably is formed from suitably connected metal channels, angle irons and straps, which frame is preferably of such height as to place the working portions of the machine at a suitable level for convenient manipulation by an operator.

The frame 15 serves to support the operating portions or mechanisms of the machine which include principally a leg carrying wheel 20, sometimes called a "leg wheel," adapted to carry the leg into position to have the meat stripped therefrom and to carry the remaining bones out of such position, a pair of opposed meat removing or stripping rolls 21a and 21b adapted to strip or pull the meat from the bones, a conveyor 22 positioned to receive the meat stripped from the bones and to carry it away to a point of use, and a drive 23 for driving the several aforementioned mechanisms.

The leg wheel 20 may be of any suitable form but we prefer to employ a wheel including a rim 25 carried by spokes 26 radiating from a mounting hub 27. Projecting substantially radially from the rim 25 at diametrically opposite points are two leg carrying hooks or leg hooks 30, 30 which are shown more in detail in Figs. 8 and 9 to which reference now is made. Each hook 30 includes a shank 31 and a bifurcate head having arms 32a and 32b providing a leg receiving notch 33. In order to facilitate the operation of placing a leg in the hook, one of the arms 32b is made somewhat longer than the other so as to provide a guide to enable the operator to guide the leg into the hook quickly and easily. The hooks 30, 30 are suitably secured to the wheel rim 25 and preferably each hook is provided with a reduced stem 34 which projects through a suitable opening in the rim 25 and receives threadedly thereon a nut 35.

The leg wheel 20 is mounted for rotation about a horizontal axis by a shaft 40 journaled in bearings 41 and 42 suitably supported by the frame 15. The shaft 40 is so positioned that the forward portion of the wheel 20 projects forwardly of the machine in a position for convenient access by the operator and the rearward portion of the wheel is in close proximity to the stripping rolls 21 hereinafter described more in detail.

The shaft 40 is rotated by the drive 23 hereinafter described more in detail to carry the leg hook 30, 30 alternately downwardly past the operator's position at the front of the machine and then upwardly between the stripping rolls 21a and 21b.

The stripping rolls 21a and 21b are mounted for rotation about parallel axes lying in the same horizontal plane. To this end, the roll 21a is carried by a shaft 50 journaled in fixed bearings 51 and 52. The roll 21b is carried by a shaft 53 journaled in spring tensioned bearings 54 and 55. Thus, the shaft 53 and the roll 21b carried thereby are yieldingly urged toward the shaft 50 and the roll 21a carried thereby, under the tension imposed by the springs (not shown) of the bearings 54 and 55 whereby the roll 21b may be moved away from the roll 21a against the pressure of the springs aforesaid. The tension of the springs may be adjusted by the adjusting nuts 56 and 57 of the bearings 54 and 55 for a purpose which will be explained hereinafter.

Each of the rolls 21a and 21b is formed by a solid rubber drum 60 (Fig. 8) which carries an endless belt 61 provided with a plurality of fingers or studs 62. The belt 61 and the integral fingers or studs 62 preferably is formed from a material having suitable mechanical strength, flexibility, resiliency and chemical inertness for the purpose. We have obtained excellent results by the use of neoprene having a durometer hardness of approximately 60 and prefer to use such material. We have found that the durometer hardness of the neoprene forming the belt 61 should be within the range of from 55 to 65 in order to provide desirable results. If the neoprene is harder than 65 durometer, the fingers or studs have a tendency to break off and if the neoprene has a hardnes less than 55 durometer, the material is not sufficiently rigid to satisfactorily remove the meat from the bone, as hereinafter explained.

Each of the solid rubber drums 60 carrying the belts 61 is mounted on the corresponding shaft and is secured thereon by circular metal plates 163, 163 which are compressed against the drum 60 by nuts 164, 164 threaded onto the shaft. Rotation of the nuts 164, 164 in a direction to cause them to move toward each other causes the plates 163 to move toward each other and compress the drum 60 in an axial direction with a corresponding expansion of the drum in a radial direction whereupon the belt 61 is caused to be tightly held on the drum 60. We prefer to form the drums 60 of rubber having a durometer hardness of approximately 55 to approximately 65.

The fingers or studs 62 are arranged in a series of diagonally extending spaced rows with the studs or fingers being spaced in each of the rows whereby all of the studs or fingers are mutually spaced. Each of the fingers 62 includes a main body portion 63 of cylindrical form extending throughout approximately two-thirds of the height of the stud or finger and a reduced portion 64 of cylindrical form at the outer end extending throughout approximately one-third of the height of the stud or finger. The reduced outer portion 64 of the finger or stud is approximately one-half the diameter of the main body portion.

The stripping rolls 21a and 21b are mounted so that the distance between centers of the rolls is equal to approximately twice the radius of each roll at its largest diameter. In other words, the rolls are so mounted that the extreme ends of the fingers or studs of the rolls are in substantially tangential relation except at a portion of each roll as hereinafter explained.

Each of the rolls 21a and 21b is provided with a portion of its periphery arranged chordally or flatted as illustrated particularly in Figs. 12a to 12c inclusive. This is accomplished by providing each of the solid rubber drums 60 with a flatted or chordal portion at one portion of the periphery thereof, whereby the corresponding endless belt 61 assumes the shape of a cylinder with a flatted or chordal portion at one portion of its periphery. The rolls 21a and 21b are so mounted on their respective shafts 50 and 53 that the two flatted or chordal portions are disposed in opposition or facing arrangement when they are both in vertical position, as illustrated particularly in Fig. 12b of the drawings. The flatted portions each are of such extent that when they are in opposing relation (as shown in Fig. 12b), there is sufficient space between the rolls 21a and 21b for the leg hook 30 and a leg and thigh (indicated at 6) to pass freely between the rolls. This arrangement permits the leg and thigh to be moved into position between the two rolls freely and without any interference, whereafter the rolls upon further rotation are positioned to grip the meat and strip it from the bones, as hereinafter more particularly explained.

It will be noted at this point that the leg wheel 20 and the stripping rolls 21a and 21b are so arranged on the frame and are driven at such speeds that the leg hooks 30, 30 are moved successively through the space between the rolls 21a and 21b with the bifurcate portion of the hook moving past the rolls at approximately the central portions thereof measured in a direction axially of the roll and at the time the flats are in opposed relation.

The conveyor 22 is disposed below the stripping rolls 21a and 21b for carrying away to a point of further use the meat which has been stripped from the leg and thigh bones by the machine and which drops onto the conveyor. The conveyor 22 may take any suitable form but preferably we provide an endless belt type conveyor comprising an endless belt 70 trained around two rolls 71 and 72, the roll 71 being supported on a shaft 73 journaled in fixed bearings 74, 74 secured to the frame 15 and the roll 72 being journaled in adjustable spring tensioned bearings 75, 75 suitably supported at the other side of the frame 15. While the belt 70 may be made from any suitable material having sufficient strength, flexibility and chemical inertness, we prefer to form the belt from neoprene.

Extending upwardly from the conveyor belt 70 in a generally vertical direction is a forward baffle 80 and a rearward baffle 81 which baffles together serve to catch and direct onto the belt 70 the meat which is removed from the leg or leg and thigh carried by the leg wheel. The forward baffle 80 is provided with a notch 82 through which the leg hook and corresponding portion of the leg wheel may pass.

The several mechanisms hereinbefore described preferably are driven from a single source of power although separate sources may be provided. It is essential, however, that the rotation of the leg wheel 20 and the stripping rolls 21a and 21b be synchronized in order that the leg hooks 30, 30 may be moved through the space between the stripping rolls 21a and 21b at the proper portion of the revoltuion of the latter.

The drive 23 includes a motor 100 which is of the gear head type. The motor 100 is connected through a coupling 101 to a shaft 102 which drives two crown gear mechanisms 103 and 104 respectively. The gear mechanism 103 drives a shaft 105 which carries a sprocket 106 over which is trained a chain 107 which is also trained around a sprocket 108 carried on the shaft 53 to thereby rotate such shaft and the roll 21b carried thereby. The shaft 105 also drives a crown gear mechanism 110 which drives a shaft 111 on which is carried a sprocket 112 over which is trained a chain 113 which is also trained around a sprocket 114 carried on the shaft 40 and driving the shaft 40.

The crown gear mechanism 104 drives a shaft 120 on which is carried a sprocket 121 over which is trained a chain 122 which is also trained around a sprocket 123 carried on the shaft 50 which also carries the roll 21a to thereby drive the latter.

The shaft 50 also carries at its rearward end a sprocket 130 around which is trained a chain 131 which is also trained around a sprocket 222 carried on the shaft 73 which carries the roller 71 and which shaft therefore drives the belt conveyor 70.

Means are provided for cleaning the rolls 21a and 21b which as will be apparent as the description proceeds receive between the studs or fingers thereof small pieces of meat which are removed from the leg and thigh bone and which pieces of meat tend to clog the spaces between the fingers or studs. It is important to remove such small pieces of meat in order that the fingers or studs may be fully effective to perform their meat removing function.

To the foregoing, we provide a pair of air nozzles 150 and 151 which are connected respectively to air conduits 152 and 153 which are in turn connected to a suitable source (not shown) of air under suitable compression. The nozzle 150 is supported by the frame 15 in a position below and spaced from the lower peripheral portion of the roll 21b as seen particularly in Fig. 4 of the drawings. The nozzle 150 is positioned so as to direct a jet of air in a direction generally tangentially of the periphery of the roll 21b but impinging upon the roll and in a direction parallel to and along the spaces between adjacent rows of projections or studs so as to pass along each of such spaces of the roll as the roll is rotated past the jet of air issuing from the air nozzle 150.

In a similar manner, the nozzle 151 is arranged correspondingly with respect to the roll 21a in order to remove therefrom any particles of meat which may be lodged between the studs or fingers of that roll.

A suitable receptacle 200 which preferably is removable is disposed below the leg wheel 20 in position to receive the leg or leg and thigh bones from which the meat has been removed by the machine. It will be noted that the leg hooks 30, 30 are so arranged that a leg is supported thereby as the leg hook moves from a position at the bottom of its circle of rotation upwardly through the space between the stripping rolls and through a position at the top of the wheel. As the hook moves downwardly at the forward side of the machine the bones are brought into position in front of the operator where they may be quickly and easily removed and allowed to drop into the receptacle 200.

The machine is placed in operation by energizing the motor 100 which, operating through several elements of the drive, rotates the leg wheel 20, the stripping rolls 21a and 21b and the conveyor 22.

The leg and thigh, after having been prepared as above described, is hung on one of the leg hooks 30 as the latter is rotated from a position at the bottom of its circle of rotation and upwardly toward its passage between the stripping rolls 21a and 21b. The leg and thigh is arranged on the hook as illustrated particularly in Fig. 9 with the hook engaged under the hock and with the rearward portion of the leg and thigh facing inwardly toward the rim of the leg wheel. As the leg wheel is rotated, the leg and thigh is carried upwardly between the two stripping rolls, the latter being provided, as aforesaid, with flats which during that portion of the rotation of the stripping rolls, in which the flats are in opposing relation provide a space to permit the leg hook to be moved past and between the stripping rolls so as not to interfere with the operation of the stripping rolls or to damage the fingers carried by the rolls.

The stripping rolls are rotated in the same directions whereby the two inner, opposed portions move downwardly, as indicated by the arrows in Figs. 12a to 12c inclusive. The stripping rolls are so dimensioned and so timed in respect to each other and to the leg wheel that just as soon as the leg hook has cleared the stripping rolls the peripheries of the latter come together and grippingly engage the meat at a point just below the hock. Owing to the fact that the leg and attached thigh are being moved upwardly and at the same time the peripheries of the stripping rolls are moving downwardly, the stripping rolls grip the meat and pull it downwardly relatively to the bones so that the meat is stripped or pulled off the bones with a minimum of injury to or fragmentation of the meat. The fingers 62, the continuous portion of the belt 61 with which the fingers 62 are integral, and the drum 60 which serves as a backing or support for the belt 61, all are sufficiently soft and yieldable so that the opposing portions of the stripping rolls 21a and 21b between which the meat is gripped, spread apart sufficiently so that the meat is not damaged by the compressing forces exerted upon it by the stripping rolls. On the other hand, the foregoing elements provide sufficient resistance to separation of the opposing portions of the rolls. At this point, it should be noted that the tension on the spring tensioned bearings is sufficient to prevent the roll 21b from being moved bodily in the normal operation of the machine.

The meat stripping action being in a direction away from the hock and toward the larger end of the leg, there is no tendency to remove or break the needle-like bony members which are attached to the leg bone and there is no tendency to strip off the gristle which covers the joint between the leg bone and the thigh bone. Inasmuch as the leg bone and attached thigh bone are moved upwardly and the meat is moved downwardly the meat is completely removed from the bones and falls free of the stripping rolls 21a, 21b and onto the belt 70 which carries it away from the machine and to a point of further use. In this connection, the guides 80 and 81 are so arranged as to guide the meat onto the belt and to prevent it from falling onto the floor. The bones are carried upwardly and over the top of the leg wheel and into position before the operator by whom they can be removed readily to clear the leg hook for the placement of a leg and thigh thereon immediately after removal of the stripped bones.

In the preferred embodiment of the invention, as illustrated in the drawings, the stripping rolls are approximately 9½" in diameter—that is, the diameter measured between the extreme ends of the fingers—except at the flats. Each rubber drum is approximately 4" in radius and the flat is approximately 6" long. The endless portion of the finger carrying belt is approximately 4" wide and approximately ¼" thick. The fingers which are approximately ½" in height have a diameter of approximately ¼" at their main body portions and approximately ⅛" at their reduced portions. They are spaced apart ½" between centers transversely of the belt and ⅜" between centers in the diagonal rows.

In the preferred embodiment of the invention, the leg wheel is approximately 16" in diameter measured across the outer surface of the rim and each leg hook projects beyond the rim, with the inner portion of the notch located approximately 2" radially beyond the rim. Thus, a leg carried by the hook will be located at a distance about 10" from the axis of the leg wheel.

The drive is so designed and the motor is operated at such speed as to provide a leg wheel speed of between 7½ and 20 revolutions per minute (R. P. M.). We prefer to operate the machine at a wheel speed of approximately 14 revolutions per minute (R. P. M.). As noted above, the distance of the leg on the leg hook from the axis of the leg wheel is approximately 10". Therefore, at a wheel speed of 7½ R. P. M., the peripheral speed of a leg attached to the leg hook is approximately 39 feet per minute (F. P. M.). With a wheel speed of 20 R. P. M., the corresponding lineal speed or surface of the leg or leg and thigh is approximately 105 F. P. M. and with a wheel speed of 14 R. P. M., the lineal speed of the leg or leg and thigh is approximately 73 F. P. M.

The movement of the leg wheel and stripping rolls must, of course, be synchronized so that each leg hook is carried between the rolls when their flat portions are vertical and in facing relation. Since there are two leg hooks on the leg wheel, the stripping rolls must be rotated at twice the speed (R. P. M.) of the leg wheel.

In the embodiment of the machine herein shown and described, we prefer to operate the stripping rolls at a speed of between 15 and 40 R. P. M., with a preferred speed of 28 R. P. M. Assuming the stripping rolls to be 9½" in diameter—that is, the diameter measured between the extreme ends of the fingers or studs—the peripheral or surface speed of the fingers is approximately 37 feet per minute for a speed of 15 R. P. M., approximately 70 feet per minute for a speed of 28 R. P. M., and approximately 100 feet per minute for a speed of 40 R. P. M.

The two stripping rolls are operated at the same speed (R. P. M.) and since they are the same size, the peripheral speeds of the two rolls are equal.

Since the surfaces of the stripping rolls are moving in a direction opposite to the direction of movement of the leg hook, the relative surface speed is the sum of the surface speeds of the stripping roll and the leg hook. Thus in the machine as described, the minimum relative surface speed is approximately 76 F. P. M., and the maximum is approximately 205 F. P. M., with the preferred speed being approximately 143 F. P. M.

It will be seen from the foregoing that the machine operated at speeds such as set forth has a production capacity of from 15 to 40 legs (or leg and thigh) per minute, inasmuch as two legs are deboned upon each revolution of the leg wheel.

While the present invention has been described in connection with the removal of the meat from the leg bone and attached thigh bone of poultry, it will be understood that it is equally applicable to the removal of the meat from a leg bone to which no thigh bone is attached.

In addition, the principle of the machine and method as disclosed herein may be used for removing the meat from the leg, or leg and thigh of other birds, such as turkeys, with suitable modification of the machine in order to accommodate legs of other sizes.

From the foregoing, it will be seen that the present invention provides a machine and process for removing the meat from the bones of a cooked poultry leg or leg and attached thigh in a highly effective manner. The direction of application of the meat-removing force is such that there is substantially no danger of removing or breaking the needle-like bony member which lies close against the leg bone or the gristle that overlies the joint between the leg and thigh bones. The meat-removing force is applied in such a manner that the meat is gripped from two sides and is pulled off the bone in a direction generally parallel to the longitudinal axis of the bone and there is a minimum of breakage or crushing of the meat.

The machine is automatic in its operation, except for the placement of the leg and thigh in the leg wheel hook and the removal of the stripped bones, which two operations are performed manually. These two operations are so simple that they can be performed by an operator having no special experience, skill or dexterity. In fact, such an operator can readily perform these operations when the machine is operating at its preferred production rate or even at a higher production rate.

The machine is relatively simple in construction and requires a minimum of upkeep and servicing. In fact, the only parts which may require replacement over a long period of use are the finger carrying belts and these can be replaced quickly and easily as will appear from the foregoing description.

The machine not only is very simple to operate and service but is relatively safe to operate. The stripping rolls are located at the back of the machine on the opposite side from the operator's position and therefore there is little likelihood of the operator being injured thereby. The leg wheel moves its hooks at a relatively low speed so that the operator can readily attach legs thereto and remove bones therefrom with relative safety.

We claim:

1. A machine for removing the meat from a cooked poultry leg comprising a support, a pair of generally cylindrical rolls each having closely spaced flexible studs upstanding radially from the surface thereof, means mounting said rolls on said support for rotation about parallel axes with the outer ends of their respective studs moving in substantially tangent paths, means connected to said rolls for rotating said rolls in opposite directions at the same peripheral speed, a leg-carrying element mounted on said support for suspending a poultry leg, and means connected to said element for moving said element between said rolls in a direction opposite to the common direction of movement of the opposing studs of said rolls, said rolls each having corresponding portions of their respective peripheries of lesser diameter than the remainder of the periphery thereby to cause the outer surfaces of the studs at such portions to be spaced apart a greater distance when in opposing relation than the remainder of the studs.

2. A machine for removing the meat from a cooked poultry leg comprising a support, a pair of generally cylindrical rolls each having closely spaced flexible studs upstanding radially from the surface thereof, means mounting said rolls on said support for rotation about parallel axes with the outer ends of their respective studs moving in substantially tangent paths, means connected to said rolls for rotating said rolls in opposite directions at the same peripheral speed, a leg carrying wheel mounted on said support having a hook for suspending a poultry leg, and means connected to said wheel for moving said wheel to carry said hook between said rolls in a direction opposite to the common direction of movement of the opposing studs of said rolls, said rolls each having corresponding portions of their respective peripheries of lesser diameter than the remainder of the periphery whereby the outer surfaces of the studs at such portions are spaced apart a greater distance when in opposing relation than the remainder of the studs.

3. A machine for removing the meat from a poultry leg comprising a support, a pair of generally cylindrical rolls each having closely spaced, flexible studs upstanding radially from the surface thereof, means mounting said rolls on said support for rotation about parallel axes with the outer ends of their respective studs moving in substantially tangent paths, means drivingly connected to said rolls for rotating said rolls in opposite directions, a leg carrying element for suspending a poultry leg, and means including a wheel carrying said element and rotatable about an axis perpendicular to the axes of said rolls for moving said element between said rolls in a direction opposite to the common direction of movement of the opposing studs of said rolls, said rolls each having corresponding portions of their respective peripheries of lesser diameter than the remainder of the periphery whereby the outer surfaces of the studs at such portions are spaced apart sufficient distance when in opposing relation to permit said element to be moved past and between said rolls.

4. A machine for removing the meat from a poultry leg comprising a support, a pair of generally cylindrical rolls each having closely spaced, flexible studs upstanding radially from the surface thereof, means mounting said rolls on said support for rotation about parallel axes with the outer ends of their respective studs moving in substantially tangent paths, means drivingly connected to said rolls for rotating said rolls in opposite directions at a peripheral speed of between approximately 39 and approximately 105 feed per minute, a leg carrying element for suspending a poultry leg, and means connected to said element for moving said element between said rolls in a direction opposite to the common direction of movement of the opposing studs of said rolls at a lineal speed of between approximately 37 and approximately 100 feet per minute, said rolls each having corresponding portions of their respective peripheries of lesser diameter than the remainder of the periphery whereby the outer surfaces of the studs at such portions are spaced apart a greater distance when in opposing relation than the remainder of the studs.

5. A machine for removing the meat of a cooked poultry leg from the leg bone comprising a support, means including a leg-carrying element mounted on said support for moving the leg along a predetermined path in the general direction of the longitudinal axis of the leg bone, and means including opposed compression elements mounted on said support on opposite sides of said predetermined path for applying yieldable, opposed, compression forces to the meat in directions transversely of the direction of movement of the leg-carrying element to strip the meat from the bone.

6. A machine for removing the meat of a cooked poultry leg from the leg bone comprising a support, means including opposed compression elements on said support for applying yieldable, opposed compression forces to the meat of said leg to grip the meat and means on said support including a leg-carrying element movable along a predetermined path past and between said compression elements to carry the leg bone past and between said compression elements, to thereby apply forces to the meat and bone to move the meat relatively to the bone in a direction generally parallel to the longitudinal axis of the bone, to pull the meat from the bone.

7. A machine for removing the meat of a cooked poultry leg from the leg bone which comprises a support, means including opposed rolls mounted on said support each having a plurality of closely spaced flexible, resilient studs upstanding radially from the periphery thereof, means connected to said rolls for rotating them in opposite directions, and means on said support, including a leg-carrying element movable past and between said rolls for moving a poultry leg past and between said rolls along a predetermined path in the general direction of the longitudinal axis of the leg bone and oppositely to the common direction of movement of the opposed peripheries of said rolls.

8. A machine for removing the meat from a cooked poultry member including a bone and the meat normally adhering thereto, said machine comprising a support, a pair of rolls each having flexible, resilient peripheral surface portions, means mounting said rolls on said support for rotation in close proximity with their peripheral portions in opposed relation, means connected to said rolls for rotating said rolls in opposite directions, an element mounted on said support for carrying a poultry member, and means connected to said element for moving said element past and between said rolls in a direction opposite to the common direction of movement of the opposed peripheral surface portions of said rolls, to thereby move the poultry member past and between said rolls to strip the meat from the bone.

9. A machine for removing the meat from a cooked poultry member including a bone and the meat normally adhering thereto, said machine comprising a support, a pair of rolls each having a cylindrical peripheral portion and a peripheral portion of lesser radius than the cylindrical portion, and closely spaced flexible studs upstanding radially from the peripheral surface portions thereof, means mounting said rolls on said support for rotation about parallel axes with the outer ends of at least certain of their respective studs on the cylindrical peripheral portions moving in substantially tangent paths and the remainder of the studs moving in paths wherein their outer surfaces are spaced apart a greater distance when in opposing relation than said first studs, means connected to said rolls for rotating said rolls in opposite directions at the same peripheral speed, an element mounted on said support for carrying a poultry member, and means connected to said element for moving said element past and between said rolls in a direction opposite to the common direction of movement of the opposing studs of said rolls, to thereby move the poultry member past and between the rolls to strip the meat from the bone.

References Cited in the file of this patent

UNITED STATES PATENTS

| | | |
|---|---|---|
| 1,435,877 | Reubold | Nov. 14, 1922 |
| 1,744,677 | Reid et al. | Jan. 21, 1930 |
| 2,267,442 | Clark | Dec. 23, 1941 |
| 2,327,224 | Spang | Aug. 17, 1943 |
| 2,553,113 | Rogers | May 15, 1951 |
| 2,571,544 | Cutrera | Oct. 16, 1951 |